United States Patent [19]

Epstein et al.

[11] 3,965,272

[45] June 22, 1976

[54] METHOD OF FREEZE TREATING MAYONNAISE-CONTAINING PRODUCTS

[75] Inventors: Jacob J. Epstein; Lawrence R. York, both of Topeka, Kans.

[73] Assignee: Seymour Foods, Inc., Topeka, Kans.

[22] Filed: Aug. 18, 1975

[21] Appl. No.: 605,631

Related U.S. Application Data

[63] Continuation-in-part of Ser. No. 496,455, Aug. 12, 1974, Pat. No. 3,965,270.

[52] U.S. Cl. ............................. 426/524; 426/605; 426/614; 426/644
[51] Int. Cl.² ..................... A23L 1/24; A23B 4/06; A23B 5/04
[58] Field of Search .......... 426/327, 393, 524, 605, 426/614, 644, 645

[56] References Cited
UNITED STATES PATENTS

| | | | |
|---|---|---|---|
| 3,093,486 | 6/1963 | Krett | 426/605 |
| 3,297,454 | 1/1967 | Webster et al. | 426/524 |
| 3,368,363 | 2/1968 | Alaburda et al. | 426/524 |
| 3,425,843 | 2/1969 | Japiske | 426/605 |
| 3,676,157 | 7/1972 | Wintersdorff | 426/605 |

*Primary Examiner*—Jeanette M. Hunter
*Attorney, Agent, or Firm*—Robert M. Ward

[57] ABSTRACT

A method of freeze treating mayonnaise and mayonnaise-containing products, such as egg, chicken, or ham salad, in which the frozen product may be satisfactorily stored and upon thawing maintains the physical and chemical characteristics of its pre-frozen state, which method comprises immersing mayonnaise or a mayonnaise-containing product in an inert liquid which is maintained at a temperature of between approximately −50°F. and 0°F., maintaining the product therein until completely frozen and removing the product and storing it at temperatures of between approximately −50°F. and 0°F.

11 Claims, No Drawings

METHOD OF FREEZE TREATING MAYONNAISE-CONTAINING PRODUCTS

BACKGROUND OF THE INVENTION

The present application is a continuation-in-part of application Ser. No. 496,455, filed Aug. 12, 1974, now U.S. Pat. No. 3,965,270, and entitled, "Method of Freezing Cooked Eggs" by the inventor hereof and assigned to the same assignee.

The present invention relates generally to methods of preserving mayonnaise. More specifically, the present invention concerns the preservation of mayonnaise and mayonnaise-containing products, such as egg, chicken and ham salad, by immersion thereof in a liquid bath within a specified and critical temperature range.

In the commercial production of egg salad, chicken salad, and ham salad it has been frequently desireable to be able to store those products for an extended period of time in such a manner as to preserve physical and chemical characteristics thereof and thereby to preserve the desirable characteristics of the freshly made product. Various methods of preserving such mayonnaise-containing sandwich component materials have been suggested to preserve such products for extended periods of time. No prior method of freezing mayonnaise or mayonnaise-containing products has heretofore been found to be commercially acceptable.

The fundamental problem involved in the freezing and storage of mayonnaise and mayonnaise-containing sandwich component products has been occasioned by the delicate emulsion nature of mayonnaise itself. Mayonnaise is defined as the emulsified semisolid food prepared from edible vegetable oil and one or both of two acidifying ingredients—vinegar diluted with water to an acidity, calculated as acetic acid, of not less than 2½% by weight, which may be mixed with the optional acidifying ingredient citric acid, providing the citric acid concentration is not greater than 25% of the total acid calculated as acetic acid. Lemon or lime juice in its various forms may be used, providing its concentration is at least 2½% by weight when calculated as citric acid. Mayonnaise must also contain one or more of the egg-yolk containing ingredients, such as liquid egg yolks, frozen egg yolks, dried egg yolks, liquid whole eggs, frozen whole eggs, dried whole eggs, or any more of the foregoing with liquid egg white or frozen egg white.

Specific condiments which may flavor the mayonnaise are any suitable, harmless food seasoning or flavoring (other than imitations), provided it does not impart to the mayonnaise a color simulating the color imparted by egg yolk. 21 C.F.R. Section 25.1. As used herein, the term "mayonnaise" will also be used to include "salad dressing", which differs from true mayonnaise in the amount of egg yolk and/or whole egg and in the water/oil ratio. (Federal specifications for salad dressing are set forth in 21 C.F.R. Section 25.3.)

In the prior art, it has often been thought to be desirable to freeze mayonnaise. However, the above referred to delicate emulsion nature of mayonnaise has not permitted the freezing and thawing thereof without substantial breakdown of the emulsion structure, which resulted in the oil component of the mayonnaise separating out, leaving a messy, undesirable, unpalatable mixture of oil, vinegar, egg yolk material and condiments.

Faced with the fact that mayonnaise could not be frozen and thawed satisfactorily, the proposed solution to this prior art failing was to develop a product which could be frozen. However, even though such a product could be frozen and then thawed without disrupting the emulsion phase thereof, those ersatz products were completely unsatisfactory, because such freeze-thaw stability could only be achieved by incorporating a large proportion of stabilizer, such as starch, into the product formulation, which made it completely different from mayonnaise and quite unpalatable and unattractive visually. Hence, such products have been of little commercial utility, either by themselves or as an ingrediant in sandwich component products, such as egg, chicken and ham salad.

BRIEF SUMMARY OF THE INVENTION

The present invention involves a method whereby mayonnaise and mayonnaise-containing sandwich component products such as egg, chicken, and ham salad, can be stored satisfactorily for substantial periods of time in the frozen state and, upon thawing, maintain the physical and chemical characteristics thereof substantially unchanged from the pre-frozen state.

The freeze treating method of the present invention is practiced by immersing mayonnaise or mayonnaise-containing products in a liquid bath of an inert liquid. The temperature of the liquid bath must be maintained within a critical temperature range. It has been found that a temperature of below approximately −50°F. completely destroys the delicate emulsion of mayonnaise. The upper limit of operability for such inert liquid bath has been found to be approximately 0°F. The mayonnaise-containing product to be frozen is maintained in the bath until completely frozen. Next, the frozen product is then removed from the bath and stored at temperatures of between approximately −50°F. and approximately 0°F.

The inert liquid used preferably is a mixture of dichlorodifluoromethane and frozen carbon dioxide, the carbon dioxide being present in a proportion sufficient to maintain the temperature of the bath within the critical temperature range above stated. A mixture of trichlormonofluoromethane and frozen carbon dioxide may also be used. However, due to the far greater solubility of fats, such as are found in the emulsion structure of mayonnaise, when trichloromonofluoromethane is used, it is desirable to add to the inert liquid bath an edible fat before beginning the freezing process in an amount sufficient to prevent substantial outflow of oil from such mayonnaise-containing products. Alternatively, the dichlorodifluoromethane and/or trichloromonofluoromethane may be cooled by circulating a cooling liquid, such as nitrogen or other extremely cold liquid through coils immersed in the selected refrigerant or by means of physical mixing between the refrigerant and a non-toxic, inert cooling liquid.

In general, it has been found that the temperature range used is the critical element and not the particular refrigerant or composition of the bath. The relevant considerations, however, for the inert bath are that it be relatively colorless, odorless, and tasteless. It should also be non-flammable, low in toxicity and low in viscosity. Furthermore, the refrigerant selected should be relatively immiscible so that no hindrance is presented to freezing the water present in a gel structure, such as would be present in the denatured protein of egg whites in egg salad. The problems related thereto are discussed in presently pending U.S. Ser. No. 496,455 filed Aug. 12, 1974.

Accordingly, in view of the shortcomings of the prior art, it is an object of the present invention to provide a method whereby mayonnaise and mayonnaise-containing products may be frozen and thawed without breaking down the delicate emulsion structure of the mayonnaise.

It is a further object of the present invention to provide means whereby mayonnaise and mayonnaise-containing products may be stored without deterioration for long periods of time.

It is an additional object of the present invention to provide means whereby mayonnaise and mayonnaise-containing products may be frozen and thawed, and yet retain the palatable flavor and pleasing gel-like consistency of fresh mayonnaise.

It is a yet further object of the present invention to provide means whereby inert colorless, odorless, tasteless and non-toxic freezing media may be used for freezing mayonnaise and mayonnaise-containing products.

It is yet an additional object of the present invention to provide means whereby mayonnaise and mayonnaise-containing products may be frozen within a critical temperature range in an inert medium such that after the freeze-thaw process the mayonnaise is maintained in its emulsion state.

The method of the present invention may be better understood with reference to the preferred embodiments set forth in the following examples, although no unnecessary limitation is intended to be presented by the inclusion of a specific example herein:

EXAMPLE I

Egg salad, chicken salad and ham salad were prepared in a manner well-known to those skilled in the art according to the following formulations for use in subsequent freezing testing.

| Ingredient | Egg Salad | Chicken Salad | Ham Salad |
|---|---|---|---|
| Diced Egg | 57.15 | 11.71 | — |
| Boned Canned Chicken | — | 36.92 | — |
| Ground Cooked Ham | — | — | 38.89 |
| Drained Pickle Relish | 8.05 | 7.81 | 32.75 |
| Diced Celery | 8.05 | 16.54 | 10.92 |
| Mayonnaise | 24.90 | 26.55 | 16.38 |
| Mustard | 1.40 | — | .27* |
| Salt | .45 | .47 | .10 |
| Lemon Juice | — | — | .68 |
| | 100.00 | 100.00 | 99.99 |

*Dry Mustard

EXAMPLE II

The samples prepared according to the formulations disclosed in Example I hereinabove were pre-cooled in a refrigerator and then placed in a cryogenic container holding various freezing media and the temperature ranges utilized during such freezing were measured as is set forth in the chart hereinbelow. Thus, the heat transfer rate was governed by the temperature of the product to be frozen and the measured temperature of the cryogenic liquid, as well as their relative masses, and requires solid to liquid or liquid to liquid contact.

| | | Freezing Temperature °F | | | |
|---|---|---|---|---|---|
| Cryogenic Liquid | Set No. | A Mayonnaise | B Egg Salad | C Chicken Salad | D Ham Salad |
| lN$_2$ | 1 | −325 | −325 | −325 | −325 |
| lN$_2$+R12 | 2 | −225 to −210 | −235 to −225 | −237 to −225 | −235 to −234 |
| R12+lN$_2$ | 3 | −107 to −93 | −110 to −100 | −110 to −100 | −112 to −105 |
| R12 | 4 | −51 | −60 | −50 to −45 | −57 |
| R12 | 5 | −43 to −41 | −42 to −33 | −31 to −30 | −33 to −31 |
| R11 | 6 | −3 to +2 | −2 to 0 | 0 to +5 | 0 to +3 | lN$_2$ = Liquid Nitrogen;
R12 = dichlorodifluoromethane;
R11 = trichloromonofluoromethane Each sample in set 1 upon being placed in such cryogenic container floated initially on the surface of the liquid nitrogen used in set 1 until the product became partially frozen, whereupon such samples sank. Apparently, the samples were buoyed by the bubbling of the liquid nitrogen.

The samples were frozen serially in the same cryogenic container equipment, then set aside and maintained in a frozen state for later thawing evaluation. The total elapsed time for freezing the twenty-four samples was 4 hours. Approximately midway through the freezing operation there was a noticeable separation of oil in the ham salad.

All samples, with the exception of Group A (mayonnaise) were thawed the following day. Thawing was accomplished by placing the product on aluminum foil sheets at room temperature for approximately 45 minutes to 1 hour. Group A was held at −20°F. for 5 days and then allowed to thaw at room temperature for approximately 1 hour.

The thawed samples were then evaluated and the results and observations in regard thereto are set forth hereinbelow:

| Set No. | Product A (Mayonnaise) | Product B (Egg Salad) |
|---|---|---|
| 1 | Almost all liquid, emulsion broke | *Much oil separation; egg whites fragmented when touched |
| 2 | " | *Some oiling |
| 3 | 80% liquid w/w | *Much oiling |
| 4 | " | Very little oiling |
| 5 | " | OK; no oiling |
| 6 | Some oil separation | Foamy; much oiling |

*Bright yellow color of oil imparted a shine to the product.

| Set No. | Product C (Chicken Salad) | Product D (Ham Salad)** |
|---|---|---|
| 1 | Much darker than control; oil separated | Much darker than control; celery crunchy |
| 2 | " | " |
| 3 | A little darker than control; little oiling | Very foamy |
| 4 | OK | " |
| 5 | OK | " |
| 6 | Much oiling | Much oiling |

**The ham salad was observed to have lost flavor, which condition may be related to the loss of a portion of the fat prior to freezing or may be due to a physical change resulting from freezing. At −210°F. and below both chicken and ham darken quite noticeably.

EXAMPLE III

The results observed in Example II, supra, indicated that observation of precise results for mayonnaise alone may have been hindered by the solvency in various degrees of the animal fat from the chicken and ham in the refrigerant liquid bath. To avoid any possibility of such contamination, further experimental evaluation was conducted upon mayonnaise alone. This decision proved to be of no substantial difficulty in terms of producing a satisfactory sandwich component product, such as egg, chicken or ham salad, because the prior pending applications, Ser. No. 496,455, teaches fully functional results for freezing cooked egg alone and it has been known to the art that chicken and ham alone may be frozen by these means and under these conditions. The previously unsolved problem has been the successful freeze-thawing of mayonnaise. Thus, to that end further experiments were specifically directed.

From the observed results of Example II, supra, it became apparent that the delicate emulsion structure of the mayonnaise had been severely damaged, if not totally destroyed by temperatures below approximately $-100°F$. In seeking to explain this phenomenon, a theoretic approach was dictated. It is known that the faster the freeze rate, the smaller the crystals formed. Therefore, insofar as the water in the system is concerned, the lower the freeze temperature, the smaller the ice crystals formed and the less disruption to the emulsion system. However, below a certain temperature, the oil also begins to form disruptive crystals, whereas above that temperature oil is frozen into a plastic, amorphous state, which does not tend to destabilize the emulsion. Therefore, the appropriate freezing temperature is that which is low enough to effect a small ice crystal size, but high enough to prevent crystalization of the oil. Accordingly, it was then necessary further and more narrowly to determine the critical lower limit of temperature which would not result in emulsion disruption and breakdown.

In order to avoid any possibility of solublized oil from prior experimentation contaminating results, virgin dichlorodifluoromethane was used. Samples were frozen according to the methods set forth in Example II, supra, and the following results were observed.

| Sample No. | Freezant | Freezing T °F | Comments |
| --- | --- | --- | --- |
| 1 | Used | −102 | Oil separated rapidly as it thawed. |
| 2 | " | −73 to −70 | Oil separated rapidly as it thawed. |
| 3 | " | −52 to −47 | Oil separated slowly as it thawed. |
| 4 | " | −27 to −25 | No apparent separation on thawing. Yolk particle from diced egg visible. |
| 5 | New | −100 to −95 | Oil separated rapidly as it thawed. |
| 6 | " | −77 to −60 | " |
| 7 | " | −55 to −45 | Oil separated slowly & slightly as it thawed. |
| 8 | " | −27 to 25 | No apparent separation on thawing. |

Each sample was thawed at room temperature for approximately 45 minutes.

EXAMPLE IV

The freeze-thawed results of Example III, supra, indicated that the freezing temperature used was indeed critical to operability of the method to produce a thawed product possessing the characteristics of fresh, unfrozen mayonnaise and further indicated that an even narrower range of experimental freezing temperatures would be necessary to determine the lower level to operability of the method of the present invention. In order to determine that lower limit precisely and with as few variables as possible virgin dichlorodifluoromethane was used according to the methods set forth in Example II, supra. As in prior freezing samples, the temperature of the refrigerant was controlled by mixing therewith the required amount of frozen carbon dioxide to achieve the sought temperature. The following results were observed:

| Sample No. | Freezing T °F | Comments |
| --- | --- | --- |
| 1 | −58 to −54 | Begins to separate as warmed. Much oil separation at 20 min. After 2½ hours little more. |
| 2 | −50 to −46 | No oil separation visible after observation at 20 and 55 min. or 2 hours 55 min. |
| 3 | −40 to −34 | " |
| 4 | −30 to −28 | " |
| 5 | −25 to −24 | " |

The frozen mayonnaise was stored for 3 days at $-20°F$. in order to determine whether storage at those temperatures would have any effect upon emulsion stability. An initial thawing of samples was done at approximately 80°F for twenty minutes. The samples were then held for 35 minutes in a refrigerator at approximately 40°F. The product temperature was measured to be 45°F. at this juncture. Next, the thawed mayonnaise was maintained at room temperature (approximately 75°F.) for 2 hours.

At freezing temperatures of above approximately −50°F. no emulsion breakdown occurred. The thawed mayonnaise was as visually attractive and palatable as fresh, never frozen mayonnaise.

From the foregoing samples, it is clear that mayonnaise and mayonnaise-containing products, such as egg salad, ham salad, chicken salad may be successfully frozen, stored, thawed and used, if the temperature of the freezing medium is greater than approximately −50°F. and less than approximately 0°F. Generally, the period of submersion in such freezing medium need only be long enough to completely freeze the sample. The particular liquids used to constitute the freezing bath in the foregoing examples are not to be regarded as limitations on the invention hereof, as long as the material used remains liquid over the temperature range desired to be used, is relatively water immiscible (especially when egg salad is to be frozen), has low viscosity, is nontoxic, is relatively inert with respect to the oils present in the mayonnaise, is relatively odorless, tasteless, colorless, and does not substantially serve as a solvent for the oil of the mayonnaise emulsion in the specified temperature range of the method of the present invention. The examples clearly point out that the lower limit of the temperature range is absolutely critical to the method of the present invention to avoid separating and breaking down the delicate emulsion structure of mayonnaise.

The aforementioned experimental results and examples comprising the disclosure hereof are not intended to limit in any way the scope of the present invention inasmuch as variations and modifications thereof may become apparent to those skilled in the art upon reading the disclosure hereof.

What is claimed is:

1. A method of freeze treating a mayonnaise-containing product whereby such product may be stored satisfactorily in a frozen condition and upon thawing will maintain physical and chemical characteristics substantially unchanged from its pre-frozen state, said method comprising:
   immersing said product in a liquid bath of an inert liquid, said liquid maintained at a temperature of greater than approximately −50°F. but less than approximately 0°F.;
   maintaining said product in said bath until said product is completely frozen;
   removing said frozen product from said bath; and
   storing said frozen product at temperatures greater than approximately −50°F. but less than approximately 0°F.

2. The method of claim 1 wherein:
   said inert liquid is a mixture of dichlorodifluoromethane and an inert cooling liquid, said inert cooling liquid comprising a proportion of the mixture sufficient to maintain said mixture at temperatures of greater than approximately −50°F. but less than approximately 0°F.

3. The method of claim 2 wherein:
   said inert cooling liquid comprises frozen carbon dioxide.

4. The method of claim 2 wherein:
   said inert cooling liquid comprises liquid nitrogen.

5. The method of claim 1 wherein:
   said mayonnaise-containing product comprises mayonnaise.

6. The method of claim 1 wherein:
   said mayonnaise-containing product comprises mayonnaise and diced, cooked egg.

7. The method of claim 1 wherein:
   said mayonnaise-containing product comprises mayonnaise and a diced, cooked meat.

8. The method of claim 1 wherein:
   said inert liquid is a mixture of trichloromonofluoromethane and an inert cooling liquid, said inert cooling liquid comprising a proportion sufficient to maintain said mixture at temperatures of greater than approximately −50°F, but less than approximately 0°F.

9. The method of claim 8 wherein:
   said inert cooling liquid is frozen carbon dioxide.

10. The method of claim 8 wherein:
    said inert cooling liquid is liquid nitrogen.

11. The method of claim 1 further comprising:
    adding an edible oil to said inert liquid prior to immersing said mayonnaise-containing product in said liquid bath, said edible oil added in an amount sufficient to prevent substantial outflow of oil from said mayonnaise-containing product, such that a non-disruptive equilibrium is achieved thereby.

* * * * *